Patented Sept. 15, 1931

1,823,095

UNITED STATES PATENT OFFICE

OTTO GERNGROSS, OF BERLIN-GRUNEWALD, AND KURT RÜLKE, OF BERLIN-CHARLOTTENBURG, GERMANY, ASSIGNORS TO KALI-CHEMIE AKTIENGESELLSCHAFT, OF BERLIN, GERMANY

DISINFECTANT

No Drawing. Application filed October 19, 1928, Serial No. 313,640, and in Germany October 20, 1927.

It is well known that aqueous solutions of strong alkaline reaction possess, in a strong measure, a dissolving, cleansing and at the same time disinfecting property. This property has for a long time been utilized in common laundering by employing, for instance, soda ash solutions. The use of such solutions when applied to the human or animal organisms is limited, as the degree of alkalinity of such solutions, in order to be effective, exceeds by far what such organisms can bear, especially when treating cavities, mucous membranes and other sensitive parts.

Now we have found that solutions of sulphocyanates of relatively low concentration are able to increase the dissolving cleansing and swelling action on albumen and mucus of alkaline aqueous media to such a degree that with a very low alkalinity, for instance, with an active acidity of pH=8 to 10, satisfactory results are obtained.

Examples 1. 30 grams of potassium sulphocyanate are carefully pulverized and thoroughly mixed with 0.12 grams of powdered anhydrous soda ash. On dissolving this mixture in one liter of water a solution is obtained showing a pH value of 9.2, measured with the Sörensen glycocol-caustic soda buffer mixture.

2. 1.4 grams of a finely powdered ammonia-turpentine soap-powder are dissolved in 1 liter of water, and 50 grams of potassium sulphocyanate are stirred in, whereby a solution is obtained containing 5% of potassium sulphocyanate and showing a pH value of 9.4. This solution possesses a mucus dissolving property in a high degree.

We claim:—

As a new article of manufacture and trade, a solution for dissolving mucus, pus and dirt, and for disinfecting purposes containing sulphocyanates soluble in water besides a small quantity of alkaline substances in such concentration that the pH value of the solution does not exceed the amount of pH=10.

In testimony whereof we affix our signatures.

OTTO GERNGROSS.
KURT RÜLKE.